(12) United States Patent
Schultheiss et al.

(10) Patent No.: US 7,578,796 B2
(45) Date of Patent: *Aug. 25, 2009

(54) METHOD OF SHOCKWAVE TREATING FISH AND SHELLFISH

(75) Inventors: Reiner Schultheiss, Illighausen (CH); Wolfgang Schaden, Vienna (AT); John Warlick, Woodstock, GA (US)

(73) Assignee: General Patent LLC, Marietta, GA (US)

( * ) Notice: Subject to any disclaimer, the term of this patent is extended or adjusted under 35 U.S.C. 154(b) by 386 days.

This patent is subject to a terminal disclaimer.

(21) Appl. No.: 11/238,733

(22) Filed: Sep. 29, 2005

(65) Prior Publication Data

US 2006/0036196 A1 Feb. 16, 2006

Related U.S. Application Data

(63) Continuation-in-part of application No. 11/122,154, filed on May 4, 2005, now Pat. No. 7,470,240, and a continuation-in-part of application No. 11/071,156, filed on Mar. 4, 2005, now abandoned.

(60) Provisional application No. 60/703,319, filed on Jul. 28, 2005, provisional application No. 60/621,028, filed on Oct. 22, 2004, provisional application No. 60/642,149, filed on Jan. 10, 2005.

(51) Int. Cl.
  *A61H 1/00* (2006.01)
  *A61B 17/22* (2006.01)

(52) U.S. Cl. ............................ 601/2; 601/4; 606/128

(58) Field of Classification Search ............... 601/2–4; 424/9.3; 606/128; 600/437, 439, 454–459
See application file for complete search history.

(56) References Cited

U.S. PATENT DOCUMENTS 3,492,400 A * 1/1970 Klontz .................... 424/234.1
3,499,437 A * 3/1970 Balamuth ..................... 601/2
(Continued)

FOREIGN PATENT DOCUMENTS

DE 197 21 218 A1 11/1998
(Continued)

OTHER PUBLICATIONS

R.Meirer, et al; Extracorporal shock wave may enhance skin flap survival in an animal model; British Journal of Plastic Surgery; vol. 58, Issue 1, Jan. 2005, pp. 53-57; Copyright 2004; The British Association of Plastic Surgeons, published by Elsevier Ltd.

(Continued)

*Primary Examiner*—Long V Le
*Assistant Examiner*—Salieu M Abraham
(74) *Attorney, Agent, or Firm*—David L King

(57) ABSTRACT

The method of stimulating an aquatic life form is disclosed. The method has the steps of activating a pressure pulse or an acoustic shock wave generator or source to emit pressure pulse or acoustic shock waves; and subjecting the aquatic life form to the pressure pulse or acoustic shock waves stimulating said aquatic life form wherein the aquatic life form is positioned within a path of the emitted shock waves. The aquatic life form is a tissue having cells. The tissue can be an egg, zygotic embryo or larvae or an immature or a mature specimen. The aquatic life form may be a fish, shellfish, any crustacean, mussel, slam, oyster, abalone, scallop, shrimp, lobster, crab, crawfish, eel, octopus or any other aquatic life form. The method of stimulating includes activating the cells within the treated tissue thereby releasing growth factor proteins or other chemical compositions promoting growth and accelerating maturization. The tissue may be infected or exposed to infections from microbial sources such as microorganisms or viruses and the exposure to shock waves stimulates an activation of defenses of the immune system.

21 Claims, 9 Drawing Sheets

U.S. PATENT DOCUMENTS

| | | | |
|---|---|---|---|
| 3,951,140 A | | 4/1976 | Eggleton et al. |
| 4,539,989 A | | 9/1985 | Forssmann et al. |
| 4,807,627 A | | 2/1989 | Eisenmenger |
| 4,905,671 A | | 3/1990 | Senge et al. |
| 5,119,801 A | | 6/1992 | Eizenhoefer et al. |
| 5,160,336 A | * | 11/1992 | Favre .......................... 606/128 |
| 5,174,280 A | | 12/1992 | Gruenwald et al. |
| 5,222,484 A | | 6/1993 | Krauss et al. |
| 5,380,411 A | * | 1/1995 | Schlief .................. 204/157.15 |
| 5,419,335 A | | 5/1995 | Hartmann |
| 5,458,130 A | * | 10/1995 | Kaufman et al. ............ 600/449 |
| 5,545,124 A | * | 8/1996 | Krause et al. ................... 601/2 |
| 5,595,178 A | | 1/1997 | Voss et al. |
| 6,036,661 A | | 3/2000 | Schwarze et al. |
| 6,186,963 B1 | | 2/2001 | Schwarze et al. |
| 6,190,336 B1 | * | 2/2001 | Duarte et al. ................... 601/2 |
| 6,217,531 B1 | | 4/2001 | Reitmajer |
| 6,221,021 B1 | * | 4/2001 | Redano ....................... 600/454 |
| 6,368,292 B1 | | 4/2002 | Ogden et al. |
| 6,390,995 B1 | * | 5/2002 | Ogden et al. ................... 601/2 |
| 6,650,935 B1 | * | 11/2003 | Watmough ................... 604/20 |
| 6,692,557 B1 | | 2/2004 | De Nys et al. |
| 6,705,556 B2 | | 3/2004 | Laramore |
| 6,736,784 B1 | * | 5/2004 | Menne et al. ................... 601/2 |
| 6,789,502 B2 | | 9/2004 | Hjaltason et al. |
| H2119 H | * | 6/2005 | Clark et al. .............. 435/173.5 |
| 2002/0002345 A1 | * | 1/2002 | Marlinghaus ................... 601/2 |
| 2002/0077550 A1 | * | 6/2002 | Rabiner et al. .............. 600/439 |
| 2004/0055029 A1 | | 3/2004 | Wolters et al. |
| 2004/0059265 A1 | | 3/2004 | Candy et al. |
| 2004/0101929 A1 | | 5/2004 | Chang et al. |
| 2004/0162508 A1 | | 8/2004 | Uebelacker |
| 2004/0229830 A1 | * | 11/2004 | Tachibana et al. ............. 514/44 |
| 2004/0253580 A1 | | 12/2004 | Villoing et al. |
| 2004/0265431 A1 | | 12/2004 | Kleppe |
| 2005/0010140 A1 | | 1/2005 | Forssmann |
| 2005/0028742 A1 | | 2/2005 | Harris, Jr. et al. |
| 2005/0075587 A1 | * | 4/2005 | Vago .............................. 601/2 |
| 2005/0084519 A1 | * | 4/2005 | Miyazaki ................... 424/442 |
| 2005/0136537 A1 | | 6/2005 | Sinclair et al. |
| 2005/0158326 A1 | | 7/2005 | Chen et al. |
| 2005/0249667 A1 | * | 11/2005 | Tuszynski et al. ............ 424/9.3 |
| 2007/0060906 A1 | * | 3/2007 | Wu ............................. 604/507 |

FOREIGN PATENT DOCUMENTS

| | | |
|---|---|---|
| DE | 103 11 659 | 9/2004 |
| EP | 0 243 947 A1 | 4/1987 |
| EP | 0 324 711 A2 | 1/1989 |
| EP | 1 445 758 | 8/2004 |
| WO | WO 2005/018600 A2 | 3/2005 |
| WO | WO 2005/063334 A1 | 7/2005 |
| WO | WO 2005/075020 | 8/2005 |

OTHER PUBLICATIONS

T. Nishida, et al; Extracorporeal Cardiac Shock Wave Therapy Markedly Ameliorates Ischemia-Induced Myocardial Dysfunction in Pigs in Vivo; Circulation; Nov. 9, 2004; Circulation. 2004; 110; pp. 3055-3061.

L.Gerdesmeyer, et al; Antibacterial Effects of Extracorporeal Shock Waves;World Fed for Ultrasound in Medicine & Biology;printed USA;Elsevier, vol. 31,No. 1, pp. 115-119, 2005.

G.Haupt, et al; Effect of Shock Waves on the Healing of Partial-Thickness Wounds in Piglets; Journal of Surgical Research, vol. 49, No. 1, pp. 45-48, Jul. 1990 Copyright 1990 by Academic Press, Inc.

Jagadeesh, G. et al;"Novel applications of micro-shock waves in biological sciences", J. Indian Inst. Sci. 2002, 82, pp. 1-10.

Thiel, M. et al; "The use of shock waves in medicine—a tool of the modem OR; an overview of basic physical principles, history and research", Min Invas Ther & Allied Technol 2000; 9(3/4) 247-253.

Huemer, Georg M. et al; "Comparison of the effectiveness of gene therapy with transforming growth factor-B or extracorporal shock wave therapy to reduce ischemic necrosis in an epigastric skin flap model in rats"; From the Clinical Department of Plastic and Reconstructive Surgery, Cardiac Surgery, Orthopedics, and the Ludwig-Boltzmann Institute for Quality Control in Plastic Surgery, Medical University Innsbruck Austria; Feb. 13, 2004; copyright 2005 by the Wound Healing Society. ISSN: 1067-1927 (Wound Rep Reg 2005;13:262-268).

\* cited by examiner

METHOD OF SHOCKWAVE TREATING FISH AND SHELLFISH

RELATED APPLICATIONS

This application is a continuation in part of U.S. patent application Ser. No. 11/122,154 filed on May 4, 2005 now U.S. Pat. No. 7,470,240 entitled "Pressure Pulse/Shock Wave Therapy Methods and an Apparatus for Conducting the Therapeutic Methods" and U.S. patent application Ser. No. 11/071,156 filed on Mar. 4, 2005 now abandoned entitled "Pressure Pulse/Shock Wave Apparatus for Generating Waves Having Nearly Plane or Divergent Characteristics" and also claims benefit of priority to U.S. Provisional Patent Application Ser. No. 60/703,319 filed Jul. 28, 2005, U.S. Provisional Patent Application Ser. No. 60/621,028 filed Oct. 22, 2004 and of U.S. Provisional Patent Application Ser. No. 60/642,149 filed Jan. 10, 2005, the disclosures of which are incorporated herein by reference in their entirety.

FIELD OF THE INVENTION

The present invention relates to a method for stimulating and enhancing aquatic growth and disease resistance in fish and shellfish generally and more particularly to a method to accelerate stimulation and growth of fish or crustaceous life forms in the various stages of development to enhance growth and productive yields.

BACKGROUND OF THE INVENTION

Fish and shellfish are cellular tissue laden organisms having a genetic code for each aquatic species, and within each species and wide variety of specimen types. Within these genetic codes are variations or alterations which affect growth rates, yield and disease resistance.

Fish and shellfish provide a large source of food. This source of food historically came from fresh water lakes, streams and ponds and from salt water seas and oceans. Fishing was an industry primarily involved in catching large quantities of fish usually by nets cast over ships and drawn into fishing vessels which have a complete processing plant on board. These highly efficient vessels have led to over fishing of some aquatic species.

This combined with disease and other stresses put on marine life have put this primary source of food supply for many people at risk.

Efforts to control the damaging effects of pollutants are being made. Regulations controlling open water fishing are being passed. Nevertheless the growing world population will be consuming more food putting additional stress on marine life absent efforts to increase productivity of these aquatic life forms.

Far more urgent than energy supplies, the human demands and needs for clean potable drinking water are going to be the primary concern with reliable food supplies being a close second in relative importance.

Accordingly improving the yields of quality seafood is an urgent need and integral part of maintaining and meeting man's need for food.

Fish farming and aquaculture or mariculture activities are being increasingly used. In the species of fish known as catfish most are produced from fish farms. These are highly efficient ways to bring fresh fish reliably to market. Other fish types are also similarly being harvested in large quantities from such farms or fisheries. The advantage of such farms is the survival rate of the vast quantities of fish embryos is vastly improved. In the wild or nature most aquatic embryos and small larvae are simply food for predator fish. Whereas in controlled fish farms or fisheries the mortality rate is greatly reduced if the conditions are properly maintained by avoiding stress on the hatchery population and exposure to infectious diseases. Compared to natural risks survival rates are in the 100 fold to 1000 fold better in these controlled conditions albeit the risk of being a human's food is elevated to a 100 percent certainty.

Similarly advances in the harvesting of shellfish are being made in large aquaculture farms. Shrimp which is consumed at a rate of over 1.27 million tons per year are also being grown in large aqua farms. Shrimp production in millions of tons may seem huge, but when compared to fish production it is a tiny fraction of that total.

Crabs, lobsters, clams, scallops, mussels, abalone and other crustaceans can similarly be harvested in such farms.

With such highly efficient production means to grow and harvest marine life it would seem the need to open water fish would become unnecessary and cost prohibitive. The reality is such controlled fisheries and aqua farming activities are so concentrated that the exposure to microbial infections and viruses becomes a huge risk factor. Instead of losing a single school of fish to such an infection in open waters, these concentrated farms risk losing entire populations of production in many cases causing a complete shut down of hatchery operations until the epidemic can be eradicated.

U.S. patent publication US 2005/0158326 A1 entitled "Compositions for Reducing Virus Infection Rate in Aquatic Crustaceans and Applications Thereof" recites: There are about 20 viruses known to be highly pathogenic to shrimps, for example: infectious hypodermal hematopoietic necrosis virus (IHHNV), baculovirus penaei (BP), baculoviral midgut GI and necrosis virus (BMN), monodon baculovirus (MBV), hepatopancreatic parvo-like virus (HPV), reo-like virus, Taura syndrome virus, yellow head virus (YHV), white spot syndrome virus (WSSV) and so on. However, these diseases cannot be treated by the known medication such as copper sulfate, potassium permanganate, formalin, malachite green, oxytetracycline, iodoform 1-500, furyl drug, or sulfa drugs. In addition, there are problems of drug residue and drug resistance with the abovementioned drugs. And the infected shrimps are frequently detected with two or more than two viruses, the so-called "mixed infection". This situation makes the virus control of shrimps even more complicated and difficult (Diseases of Aquatic Organisms, 48, p 233-236, 2002; Fish Pathology, 35(1), 1-10, 2000; Fish Pathology 24(2), p 89-100, 1989).

A primary object of US 2005/0158326 A1 is to provide a composition for prevention and/or treatment of viral infection in order to control virus infection rates in crustaceans. The composition comprises at least one of the antibodies selected from the group consisting of monoclonal antibody, phage display antibody and antibody produced by a recombinant organism, which can bind specifically to virus. Said composition can be applied in preparation of medicine composition, nutrition composition, feed additives or feed composition.

In U.S. Pat. No. 6,705,556 B2 Charles Rolland Laramore suggests making shrimp as well as other crustaceans tolerant or immune from viral infections by exposing larval shrimp to tolerine compositions. Tolerine compositions are based on inactivated viral-particles which are taken from infected tissue ground up and made into or mixed with a nutrient upon which the shrimp larvae feed.

U.S. Pat. No. 6,692,557 teaches coating the shells of scallops, oysters, mussels or abalones with an antifouling coating composition to a shell will prevent fouling. This solution eliminates the need to periodically clean these shellfish. Fouling or biofouling is when unwanted sediment and growth of marine organisms occurs on the shells. These shellfish have a world wide market of over $6.8 billion dollars and fouling alone is a cost of about 3-7% of that total revenue that would otherwise be profit for the industry.

In US 2004/0253580 A1 an infectious salmon anaemia virus vaccine (ISAV) is proposed to immunize Atlantic salmon from this viral disease. A viral genome was found which encodes a novel viral protein suitable as a vaccine component for fighting ISAV.

Similarly in US 2004/0101929 A1 entitled "Expressing Mammalian Protein Complexes in Fish", it is stated there is a need to generate fish that are capable of expressing mammalian protein complexes. They report, for example, infectious diseases are common on fish farms due to intensive fish farming that facilitates the transmission of pathogens in an aqueous environment. By binding to pathogens, antibodies inactivate them and therefore protect fish from infectious diseases. In teleost fish, only two types of antibodies, IgM and IgD, have been found. IgM, the major isotype, binds to and inactivates pathogens. However, the efficacy is not satisfactory due to relatively low binding affinity. Expressing mammalian antibodies in fish has several advantages in preventing the fish from infectious diseases. First, antibodies with high affinity can be made using the mammalian hybridoma technology. In addition, genes encoding the antibodies can be introduced into germ-line cells of fish, and transmitted to and expressed in the progenies of the fish. Further, the expressed antibodies can protect the fish progenies during their early stage of development, when the immune system has not fully developed.

Lorenzen reported expressing mammalian single-chain antibodies in fish cells (Nat. Biotechnol. 18:1177-1180, 2000). The single-chain antibodies each contain a single hybrid polypeptide chain having a constant region of an Ig kappa chain, and variable regions of heavy and light chains. As these single-chain antibodies are not stable, they only offer limited protection.

Their invention features a fish cell expressing a mammalian protein complex having two peptide species. The fish cell contains a first nucleic acid sequence encoding a first peptide species of a mammalian protein complex, and a second nucleic acid sequence encoding a second peptide species of the mammalian protein complex. In the fish cell, a multiplicity of peptides of both peptide species are expressed, and at least one peptide of the first peptide species and at least one peptide of the second peptide species assembly to form a functional complex, i.e., a complex capable of performing the task of a naturally occurring protein complex.

The fish cell can be prepared from cells of different tissues (e.g., brain), of various fish such as yellow grouper. The above-mentioned protein complex consists of, e.g., one to four subunits of each of the two peptide species. An example of such a mammalian protein complex is a mammalian antibody, i.e., an immunoglobulin (Ig) having two heavy chains and two light chains, optionally containing a disulfide bond. In one embodiment, a functional antibody specifically binds to a microorganism, e.g., a virus, a bacterium, a protozoan, or a parasite. Another example of a mammalian protein complex is a mammalian signaling molecule, such as a cytokine or a growth factor. A signaling molecule binds to its receptor on a cell and triggers a cellular response. An interlukin, a cytokine, contains only two subunits of two different peptide species.

All of these prior art approaches suggest incorporating a vaccine, antibody or genetically modifying the aquatic life form in some fashion to improve disease resistance. Most involve introducing that modification into the food supply that will later be consumed. This may be quite safe; however, it should raise some concerns about long term health effects. Hopefully these wide scale genetic alterations prove to have no harmful unforeseen effects.

Besides infections the next or most relevant factor in fish farming is growth rate and yield. This relates to the time between embryonic existence to harvest and the size or weight achieved at harvest. Both of these factors determine to a large extent profitability. If one set of aquatic life forms be it fish or shellfish can grow faster or during the time to mature can increase more in size and weight for a give amount of nutrients then the operation will increase revenues without increasing costs.

US 2004/0055029 teaches selectively finding purebred fish and selecting a DNA fingerprint to identify breeder fish to achieve this goal.

U.S. Pat. No. 6,789,502 suggests a method for producing prey organisms enriched in highly unsaturated fatty acids (HUFAs), particularly docosahexaenoic acid (DHA). Also provided are feed compositions based on such organisms.

In a first aspect, the invention provided a method of producing prey organisms for use in aquaculture, in particular for feeding larval fish, the method comprising cultivating said organisms during at least part of their life cycle in an aqueous medium comprising at least one lipid component having a DHA content of at least 30 wt %.

In a further aspect, the invention provided a composition for feeding fish in the larval and/or non-larval stage, the composition comprising the above mentioned prey organisms; said organisms having a content of DHA of at least 12 wt % of the total lipid content of the organisms.

The feed mixture is particularly useful for high demand species such as halibut, trout, salmon and eel.

In US patent 2005/0075587 Robert Vago teaches a novel method of wound cleaning of humans, mammals and fish employing ultrasonic irradiation. In that publication he notes shock wave therapy is not used in that the inherent effects of cavitation can destroy cells and tissue.

The above related findings demonstrate that aquatic life forms like fish and shellfish undergo a systemic response via a form of cross talk or cellular communication. This finding is consistent with a similar cellular communication found in mammals. In each organism be it a fish or mammal, cellular stimulation can result in a release of proteins and other chemical compositions relating to growth factors.

The present invention has the object of stimulating tissue growth and accelerating time to maturation in addition to improving disease resistance which is summarized as follows.

SUMMARY OF THE INVENTION

The method of stimulating an aquatic life form is disclosed. The method has the steps of activating a pressure pulse or an acoustic shock wave generator or source to emit pressure pulse or acoustic shock waves; and subjecting the aquatic life form to the pressure pulse or acoustic shock waves stimulating said aquatic life form wherein the aquatic life form is positioned within a path of the emitted shock waves. In one embodiment the emitted pressure pulse or shock waves are divergent or near planar. In another embodiment the emitted shock waves are convergent having a geometric focal volume of point at a distance of at least X from the source, the method further comprising positioning the one or more aquatic life forms at a distance less than the distance X from the source.

The aquatic life form is a tissue having cells. The tissue can be an egg, zygotic embryo or larvae or immature or otherwise not fully mature or a mature specimen. The aquatic life form may be a fish, shellfish, any crustacean, mussel, clam, oyster, abalone, scallop, shrimp, lobster, crab, crawfish, eel, octopus or any other aquatic life form. The method of stimulating includes activating the cells within the treated tissue thereby releasing growth factor proteins or other chemical compositions promoting growth and accelerating maturation. The tissue may be infected or exposed to infections from microbial sources such as microorganisms or viruses and the exposure to shock waves stimulates an activation of defenses of the immune system.

DEFINITIONS

"Altered expression of a gene" means that in the genetically modified fish or shellfish an amount of messenger RNA is produced that is significantly different from an untransformed control fish or shellfish, grown under the same conditions.

"Aquatic life form" generally means any life form or organism whose normal environment requires fresh water or sea water to survive. These life forms include all species of sea mammals, fish, shellfish and other crustaceans, eels, octopus and jelly fish to name a few species.

"Coding sequence" is a nucleotide sequence, which is transcribed into mRNA and/or translated into a polypeptide when placed under the control of appropriate regulatory sequences. The boundaries of the coding sequence are determined by a translation start codon at the 5'-terminus and a translation stop codon at the 3'-terminus. A coding sequence can include, but is not limited to mRNA, cDNA, recombinant nucleotide sequences or genomic DNA, while introns may be present as well under certain circumstances.

A "curved emitter" is an emitter having a curved reflecting (or focusing) or emitting surface and includes, but is not limited to, emitters having ellipsoidal, parabolic, quasi parabolic (general paraboloid) or spherical reflector/reflecting or emitting elements. Curved emitters having a curved reflecting or focusing element generally produce waves having focused wave fronts, while curved emitters having a curved emitting surfaces generally produce wave having divergent wave fronts.

"Divergent waves" in the context of the present invention are all waves which are not focused and are not plane or nearly plane. Divergent waves also include waves which only seem to have a focus or source from which the waves are transmitted. The wave fronts of divergent waves have divergent characteristics. Divergent waves can be created in many different ways, for example: A focused wave will become divergent once it has passed through the focal point. Spherical waves are also included in this definition of divergent waves and have wave fronts with divergent characteristics.

"Embryo" a discrete mass of cells with a well defined structure that is capable of growing into a whole aquatic life form.

"Extracorporeal" occurring or based outside the living body.

"Functional fragment of a gene" refers to a fragment of a gene that can be used in a functional way. Typical functional fragments are the promoter region and the coding sequence. However, the term refers also to parts of the coding sequence that encode for a functional fragment of the protein, i.e. a domain of the protein that is functional on its own.

"Functional fragment of the protein," as used herein, refers to a fragment of the protein that, on its own or as part of a fusion protein still retains the possibility to modulate growth.

"Gene," as used herein, refers both to the promoter region of the gene as well as the coding sequence. It refers both to the genomic sequence (including possible introns) as well as to the cDNA derived from the spliced messenger operably linked to a promoter sequence.

A "generalized paraboloid" according to the present invention is also a three-dimensional bowl. In two dimensions (in Cartesian coordinates, x and y) the formula $y^n=2px$ [with n being $\neq 2$, but being greater than about 1.2 and smaller than 2, or greater than 2 but smaller than about 2.8]. In a generalized paraboloid, the characteristics of the wave fronts created by electrodes located within the generalized paraboloid may be corrected by the selection of $(p(-z,+z))$, with z being a measure for the burn down of an electrode, and n, so that phenomena including, but not limited to, burn down of the tip of an electrode $(-z,+z)$ and/or disturbances caused by diffraction at the aperture of the paraboloid are compensated for.

"Expression of a gene," as used herein, refers to the transcription of the gene into messenger RNA.

"Operably linked" refers to a juxtaposition wherein the components so described are in a relationship permitting them to function in their intended manner. A promoter sequence "operably linked" to a coding sequence is ligated in such a way that expression of the coding sequence is achieved under conditions compatible with the promoter sequence.

"Overexpression of a gene" means that more messenger RNA is produced in the genetically modified life form than in an untransformed control life form, grown under the same condition.

A "paraboloid" according to the present invention is a three-dimensional reflecting bowl. In two dimensions (in Cartesian coordinates, x and y) the formula $y^2=2px$, wherein p/2 is the distance of the focal point of the paraboloid from its apex, defines the paraboloid. Rotation of the two-dimensional figure defined by this formula around its longitudinal axis generates a de facto paraboloid.

"Plane waves" are sometimes also called flat or even waves. Their wave fronts have plane characteristics (also called even or parallel characteristics). The amplitude in a wave front is constant and the "curvature" is flat (that is why these waves are sometimes called flat waves). Plane waves do not have a focus to which their fronts move (focused) or from which the fronts are emitted (divergent). "Nearly plane waves" also do not have a focus to which their fronts move (focused) or from which the fronts are emitted (divergent). The amplitude of their wave fronts (having "nearly plane" characteristics) is approximating the constancy of plain waves. "Nearly plane" waves can be emitted by generators having pressure pulse/shock wave generating elements with flat emitters or curved emitters. Curved emitters may comprise a generalized paraboloid that allows waves having nearly plane characteristics to be emitted.

A "pressure pulse" according to the present invention is an acoustic pulse which includes several cycles of positive and negative pressure. The amplitude of the positive part of such a cycle should be above about 0.1 MPa and its time duration is from below a microsecond to about a second. Rise times of the positive part of the first pressure cycle may be in the range of nano-seconds (ns) up to some milli-seconds (ms). Very fast pressure pulses are called shock waves. Shock waves used in medical applications do have amplitudes above 0.1 MPa and rise times of the amplitude are below 100's of ns. The duration of a shock wave is typically below 1-3 micro-seconds (µs) for the positive part of a cycle and typically above some micro-seconds for the negative part of a cycle.

"Promoter of a gene" as used herein, refers to a functional DNA sequence unit that, when operably linked to a coding sequence and possibly placed in the appropriate inducing conditions, is sufficient to promote transcription of the coding sequence.

"Somatic Embryogenesis" a type of tissue culture where a piece of a donor is excised, cultured and induced to form multiple embryos.

"Teleost" any bony fish with rayed fins in a suborder that includes most living species, numbering around 20,000, but excluding sturgeons, gars, sharks, rays, and related fish.

Waves/wave fronts described as being "focused" or "having focusing characteristics" means in the context of the present invention that the respective waves or wave fronts are traveling and increase their amplitude in direction of the focal point. Per definition the energy of the wave will be at a maximum in the focal point or, if there is a focal shift in this point, the energy is at a maximum near the geometrical focal point. Both the maximum energy and the maximal pressure amplitude may be used to define the focal point.

"Zygotic Embryogenesis" is a sexual or asexual reproductive process that forms new life forms. The process of embryogenesis may occur naturally in the aquatic life form as a result of sexual fertilization or asexual processes, these embryos are called zygotic embryos and develop into eggs or cells, which can mature into larvae and ultimately the mature aquatic life form.

BRIEF DESCRIPTION OF THE DRAWINGS

The invention will be described by way of example and with reference to the accompanying drawings in which.

DETAILED DESCRIPTION OF THE INVENTION

Figure 1A:
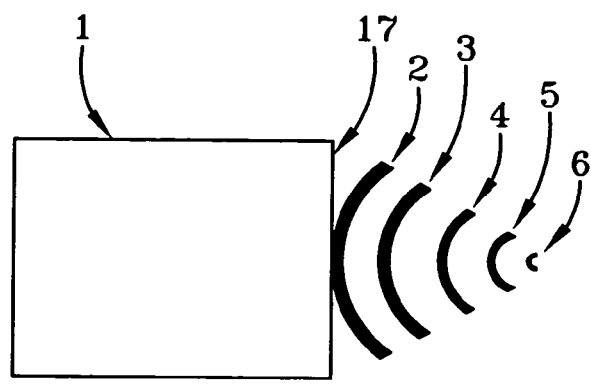
FIG. 1a is a simplified depiction of a pressure pulse/shock wave (PP/SW) generator with focusing wave characteristics.

The present invention relates to the use of various pressure pulse wave patterns or acoustic shock wave patterns as illustrated in FIGS. 1-12 for stimulating or enhancing aquatic growth of life forms such as fish or shellfish species. Each illustrated wave pattern will be discussed later in the description; however, the use of each has particularly interesting beneficial features that are a remarkably valuable new tool in the effort to accelerate fish and shellfish growth and production.

The present invention employs the use of pressure pulses or shock waves to stimulate a cellular response stimulating a tissue growth process that activates the tissue to initiate a systemic growth process in the treated specimen.

In the pressure pulse or shock wave method of treating an aquatic tissue, a zygotic embryo or somatic embryos or cultures of such embryos or larvae or immature, or partially mature aquatic life forms are positioned in a convenient orientation to permit the source of the emitted waves to most directly send the waves to the target site to initiate pressure pulse or shock wave stimulation of the target area or zone with minimal, preferably with little or no obstructing features in the path of the emitting source or lens. Assuming the treatment region is accessible through an open access region then the shock wave head 43 can be inserted and placed directly in the treatment region 200. Assuming the target area or site is within a projected area of the wave transmission, a single transmission dosage of wave energy may be used. The transmission dosage can be from a few seconds to 20 minutes or more dependent on the condition. Preferably the waves are generated from an unfocused or focused source. The unfocused waves can be divergent, planar or near planar and having a low pressure amplitude and density in the range of 0.00001 $mJ/mm^2$ to 1.0 $mJ/mm^2$ or less, most typically below 0.2 $mJ/mm^2$. The focused source preferably can use a diffusing lens or have a far-sight focus to minimize if not eliminate having the localized focus point within the aquatic tissue. Preferably the focused shock waves are used at a similarly effective low energy transmission or alternatively can be at higher energy but wherein the tissue target site is disposed pre-convergence inward of the geometric focal point of the emitted wave transmission. In treating some hard to penetrate regions, the pressure pulse more preferably is a high energy target focused wave pattern which can effectively penetrate through outer structures prior to being dampened while still exposing the aquatic tissue to activating pressure pulses or shock waves. This emitted energy preferably stimulates the cells without rupturing cellular membranes. The surrounding healthy cells in the region treated are activated initiating a growth mechanism response stimulating new growth. In the case of embryonic tissues, the cells are activated stimulating accelerated growth when cultured in a nutrient rich water environment such as plankton enriched water.

These shock wave energy transmissions are effective in stimulating a cellular response and can be accomplished without creating the cavitation bubbles in the tissue of the target site when employed in other than site targeted high energy focused transmissions. This effectively insures the tissue of the fish or shellfish does not have to experience the sensation of cellular membrane rupturing so common in the higher energy focused wave forms having a focal point at or within the targeted treatment site.

This method permits the lens or cover of the emitting shock wave source to impinge on the aquatic tissue directly or through a transmission enhancing gel, water or fluid medium during the pressure pulse or shock wave treatment. The treated area can withstand a far greater number of shock waves based on the selected energy level being emitted. For example at very low energy levels the stimulation exposure can be provided over prolonged periods as much as 20 minutes if so desired. At higher energy levels the treatment duration can be shortened to less than a minute, less than a second if so desired. The limiting factor in the selected treatment dosage is avoidance or minimization of surrounding cell rupturing and other kinds of damage to the surrounding cells or tissue while still providing a stimulating cell activation or a cellular release or activation of proteins or functional fragments of the protein or other chemical composition that modulates growth factors.

The underlying principle of these pressure pulse or shock wave therapy methods is to enrich the treatment area directly and to stimulate the aquatic tissue's own natural growth capability. This is accomplished by deploying shock waves to stimulate cells in the surrounding tissue to activate a variety of responses. The acoustic shock waves transmit or trigger what appears to be a cellular communication throughout the entire anatomical structure, this activates a generalized cellular response at the treatment site, in particular, but more interestingly a systemic response in areas more removed from the wave form pattern. This is believed to be one of the reasons molecular stimulation can be conducted at threshold energies heretofore believed to be well below those commonly accepted as required. Accordingly not only can the energy intensity be reduced in some cases, but also the number of applied shock wave impulses can be lowered from several thousand to as few as one or more pulses and still yield a beneficial stimulating response. The key is to provide at least a sufficient amount of energy to activate growth reactions. The treatment is particularly beneficial in early stages of aquatic growth, but also can be employed with appropriate transmission medias to treat infected or damaged immature or mature specimens such as infected fish or shellfish which when subjected to shock waves activates a cellular defense response to an intrusion of for example parasitic diseases or viral infections.

Ideally the present invention is best suited for large scale fish farming and mariculturing or aquaculturing operations where fish and shellfish are harvested in large quantities.

Figure 13:
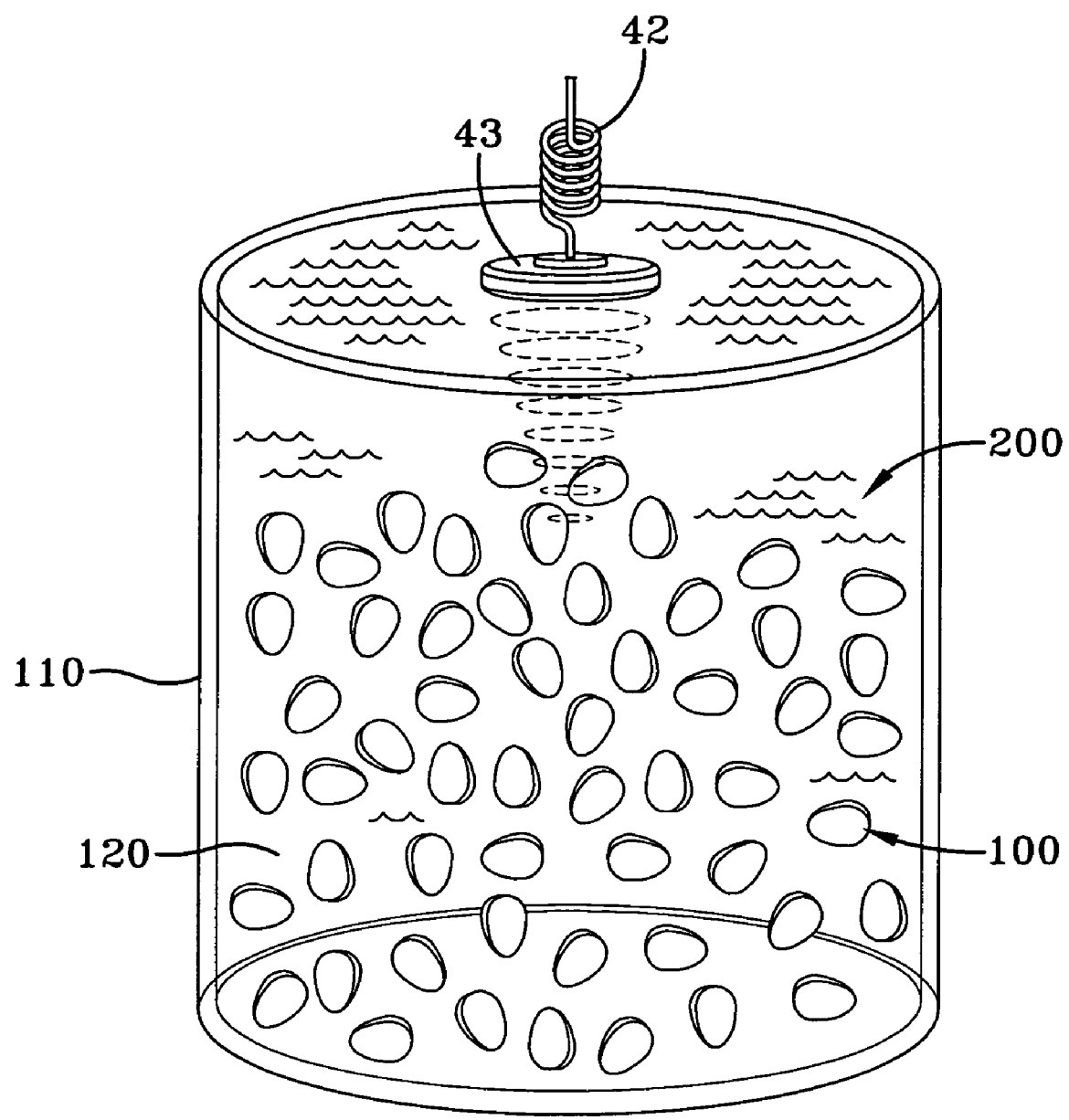
FIG. 13 shows shock waves being transmitted through a container or vat having a plurality of aquatic specimens or life forms being treated.

As shown in FIG. 13 the treated aquatic tissue can be zygotic embryos, or larvae or fry placed in large quantities in a nutrient rich environment or culture medium which easily allows the transmitted waves to pass through each egg or cluster of embryogenic cells on each life form to trigger the growth protein modulation. Thereafter the treated aquatic tissues can be placed in another nutrient rich medium to initiate accelerated full growth.

In practice treated plant specimen bean seeds were planted along with untreated control seeds. The treated seeds sprouted on average two days before the control seeds. This finding is consistent with the findings of a Canadian patent 2.376,695 which used an array of magnets to produce a magnetic field in proximity to the planted seeds. The distinction and benefit of the present invention is the treatment is applied one time to a mass quantity. The cellular stimulation having been triggered no further stimulation was required, the vegetative foliage of the treated bean plants was superior in growth and appearance as well evidencing a pronounced long-term benefit. Additionally mammals have demonstrated improved vascularization and accelerated tissue growth. Since aquatic life forms have a cellular structure the application of shock wave exposure is equally beneficial.

As further shown in FIG. 13 the pressure pulse or shock wave head 43 can be immersed in a nutrient rich fluid medium or culture 120 of zygotic embryos, eggs or larvae or other aquatic embryonic tissues or specimens 100. The treated tissue 100 can be one or more such embryo or eggs or specimens 100, preferably many more. As shown a large container or vat 110 is shown holding many thousands of such aquatic tissues 100. The shock wave head 43 is connected via cabling 42 base to a wave generator or source (not illustrated). After treating the aquatic tissue or eggs 100 the treated tissue can be released into larger holding tanks to initiate the growth process. As can be appreciated such a process is also ideally suited for salt water processes as well. The treated tissues can be selected from any variety of fish, shellfish or aquatic life form. The treated tissue may be tissue of one or more zygotic embryos or one or more somatic embryos which is micropropagated from somatic embryo in vitro from minute pieces of tissue or individual cells such as in cloning.

Nevertheless the use of such pressure pulses and acoustic shock waves can be very beneficial to aquatic life form production in terms of accelerated growth.

FIG. 1a is a simplified depiction of the a pressure pulse/shock wave (PP/SW) generator, such as a shock wave head, showing focusing characteristics of transmitted acoustic pressure pulses. Numeral 1 indicates the position of a generalized pressure pulse generator, which generates the pressure pulse and, via a focusing element, focuses it outside the housing to treat aquatic tissues. The affected tissue is generally located in or near the focal point which is located in or near position 6. At position 17 a water cushion or any other kind of exit window for the acoustical energy is located.

Figure 1B:
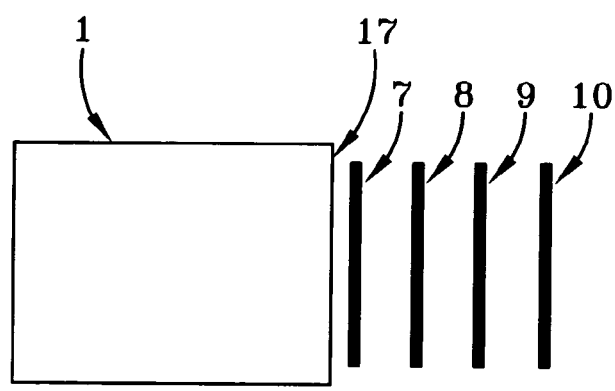
FIG. 1b is a simplified depiction of a pressure pulse/shock wave generator with plane wave characteristics.

FIG. 1b is a simplified depiction of a pressure pulse/shock wave generator, such as a shock wave head, with plane wave characteristics. Numeral 1 indicates the position of a pressure pulse generator according to the present invention, which generates a pressure pulse which is leaving the housing at the position 17, which may be a water cushion or any other kind of exit window. Somewhat even (also referred to herein as "disturbed") wave characteristics can be generated, in case a paraboloid is used as a reflecting element, with a point source (e.g. electrode) that is located in the focal point of the paraboloid. The waves will be transmitted into the tissue via a coupling media such as, e.g., ultrasound gel or oil or a nutrient rich fluid and their amplitudes will be attenuated with increasing distance from the exit window 17.

Figure 1C:
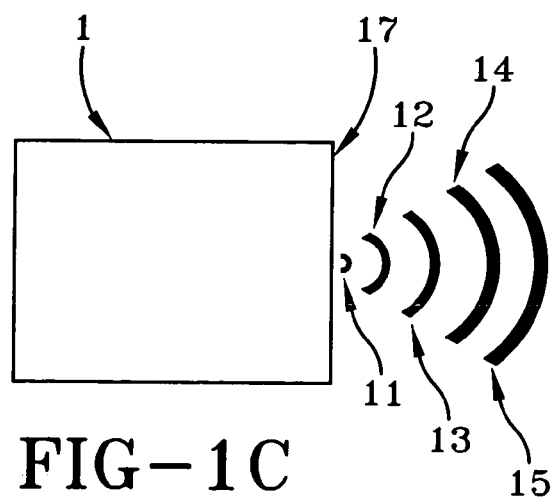
FIG. 1c is a simplified depiction of a pressure pulse/shock wave generator with divergent wave characteristics.

FIG. 1c is a simplified depiction of a pressure pulse shock wave generator (shock wave head) with divergent wave characteristics. The divergent wave fronts may be leaving the exit window 17 at point 11 where the amplitude of the wave front is very high. This point 17 could be regarded as the source point for the pressure pulses. In FIG. 1c the pressure pulse source may be a point source, that is, the pressure pulse may be generated by an electrical discharge of an electrode under water between electrode tips. However, the pressure pulse may also be generated, for example, by an explosion, referred to as a ballistic pressure pulse. The divergent characteristics of the wave front may be a consequence of the mechanical setup shown in FIG. 2b.

Figure 2A:
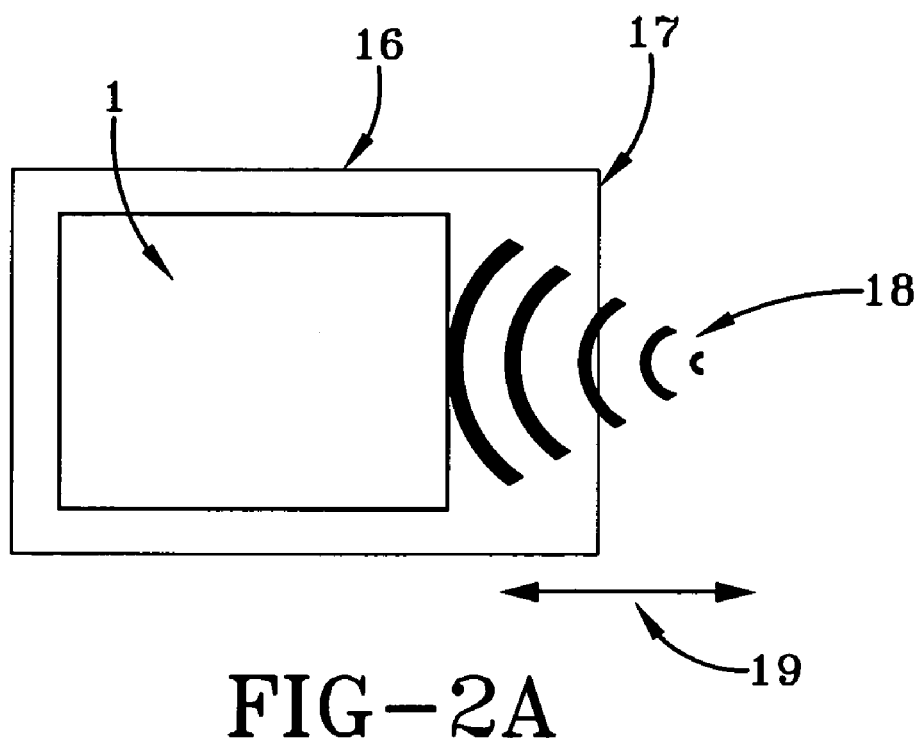
FIG. 2a is a simplified depiction of a pressure pulse/shock wave generator having an adjustable exit window along the pressure wave path. The exit window is shown in a focusing position.

FIG. 2a is a simplified depiction of a pressure pulse/shock wave generator (shock wave head) according to the present invention having an adjustable or exchangeable (collectively referred to herein as "movable") housing around the pressure wave path. The apparatus is shown in a focusing position. FIG. 2a is similar to FIG. 1a but depicts an outer housing (16) in which the acoustical pathway (pressure wave path) is located. In a preferred embodiment, this pathway is defined by especially treated water (for example, temperature controlled, conductivity and gas content adjusted water) and is within a water cushion or within a housing having a permeable membrane, which is acoustically favorable for the transmission of the acoustical pulses. In certain embodiments, a complete outer housing (16) around the pressure pulse/shock wave generator (1) may be adjusted by moving this housing (16) in relation to, e.g., the focusing element in the generator. However, as the person skilled in the art will appreciate, this is only one of many embodiments of the present invention. While the figure shows that the exit window (17) may be adjusted by a movement of the complete housing (16) relative to the focusing element, it is clear that a similar, if not the same, effect can be achieved by only moving the exit window, or, in the case of a water cushion, by filling more water in the volume between the focusing element and the cushion. FIG. 2a shows the situation in which the arrangement transmits focused pressure pulses.

Figure 2B:
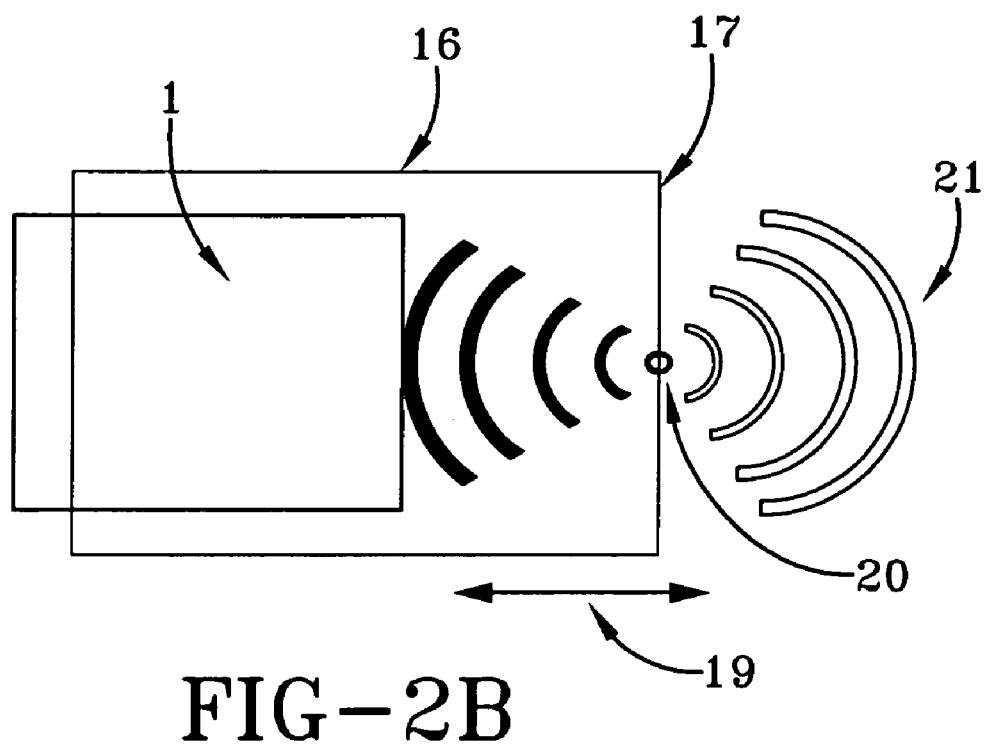
FIG. 2b is a simplified depiction of a pressure pulse/shock wave generator having an exit window along the pressure wave path. The exit window as shown is positioned at the highest energy divergent position.

FIG. 2b is a simplified depiction of the pressure pulse/shock wave generator (shock wave head) having an adjustable or exchangeable housing around the pressure wave path with the exit window 17 being in the highest energy divergent position. The configuration shown in FIG. 2b can, for example, be generated by moving the housing (16) including the exit window (17), or only the exit window (17) of a water cushion, towards the right (as shown in the Figure) to the second focus f2 (20) of the acoustic waves. In a preferred embodiment, the energy at the exit window will be maximal. Behind the focal point, the waves may be moving with divergent characteristics (21).

Figure 2C:
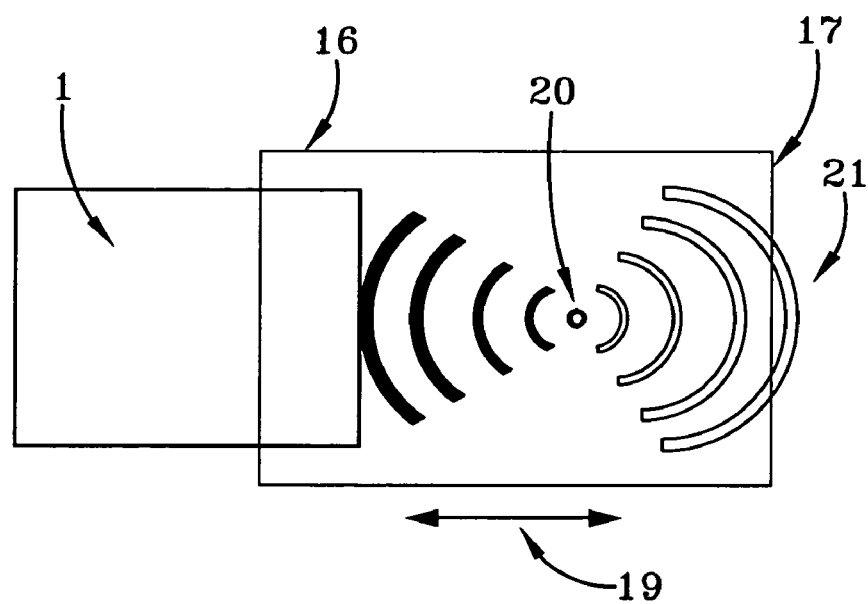
FIG. 2c is a simplified depiction of a pressure pulse/shock wave generator having an exit window along the pressure wave path. The exit window is shown at a low energy divergent position.

FIG. 2c is a simplified depiction of the pressure pulse/shock wave generator (shock wave head) having an adjustable or exchangeable housing around the pressure wave path in a low energy divergent position. The adjustable housing or water cushion is moved or expanded much beyond f2 position (20) so that highly divergent wave fronts with low energy density values are leaving the exit window (17) and may be coupled to a tissue. Thus, an appropriate adjustment can change the energy density of a wave front without changing its characteristic.

This apparatus may, in certain embodiments, be adjusted/modified/or the complete shock wave head or part of it may be exchanged so that the desired and/or optimal acoustic profile such as one having wave fronts with focused, planar, nearly plane, convergent or divergent characteristics can be chosen.

A change of the wave front characteristics may, for example, be achieved by changing the distance of the exit acoustic window relative to the reflector, by changing the reflector geometry, by introducing certain lenses or by removing elements such as lenses that modify the waves produced by a pressure pulse/shock wave generating element. Exemplary pressure pulse/shock wave sources that can, for example, be exchanged for each other to allow an apparatus to generate waves having different wave front characteristics are described in detail below.

In certain embodiments, the change of the distance of the exit acoustic window can be accomplished by a sliding movement. However, in other embodiments of the present invention, in particular, if mechanical complex arrangements, the movement can be an exchange of mechanical elements.

In one embodiment, mechanical elements that are exchanged to achieve a change in wave front characteristics include the primary pressure pulse generating element, the focusing element, the reflecting element, the housing and the membrane. In another embodiment, the mechanical elements further include a closed fluid volume within the housing in which the pressure pulse is formed and transmitted through the exit window.

In one embodiment, the apparatus of the present invention is used in combination therapy. Here, the characteristics of waves emitted by the apparatus are switched from, for example, focused to divergent or from divergent with lower energy density to divergent with higher energy density. Thus, effects of a pressure pulse treatment can be optimized by using waves having different characteristics and/or energy densities, respectively.

While the above described universal toolbox of the present invention provides versatility, the person skilled in the art will appreciate that apparatuses that only produce waves having, for example, nearly plane characteristics, are less mechanically demanding and fulfill the requirements of many users.

As the person skilled in the art will also appreciate that embodiments shown in the drawings are independent of the generation principle and thus are valid for not only electrohydraulic shock wave generation but also for, but not limited to, PP/SW generation based on electromagnetic, piezoceramic and ballistic principles. The pressure pulse generators may, in certain embodiments, be equipped with a water cushion that houses water which defines the path of pressure pulse waves that is, through which those waves are transmitted. In a preferred embodiment, an aquatic tissue is coupled via a nutrient rich fluid, ultrasound gel or oil to the acoustic exit window (17), which can, for example, be an acoustic transparent membrane, a water cushion, a plastic plate or a metal plate.

Figure 3:
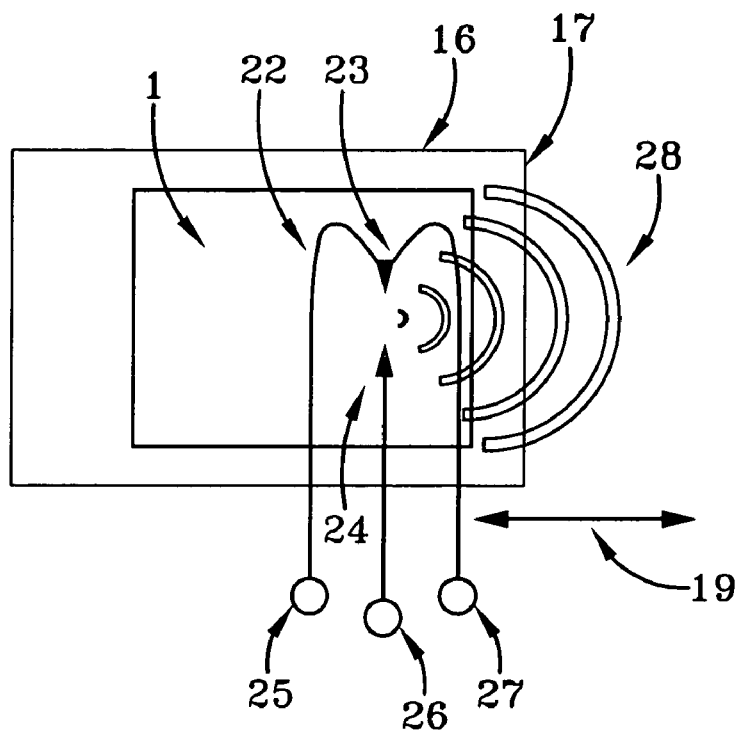
FIG. 3 is a simplified depiction of an electro-hydraulic pressure pulse/shock wave generator having no reflector or focusing element. Thus, the waves of the generator did not pass through a focusing element prior to exiting it.

FIG. 3 is a simplified depiction of the pressure pulse/shock wave apparatus having no focusing reflector or other focusing element. The generated waves emanate from the apparatus without coming into contact with any focusing elements. FIG. 3 shows, as an example, an electrode as a pressure pulse generating element producing divergent waves (28) behind the ignition point defined by a spark between the tips of the electrode (23, 24).

Figure 4A:
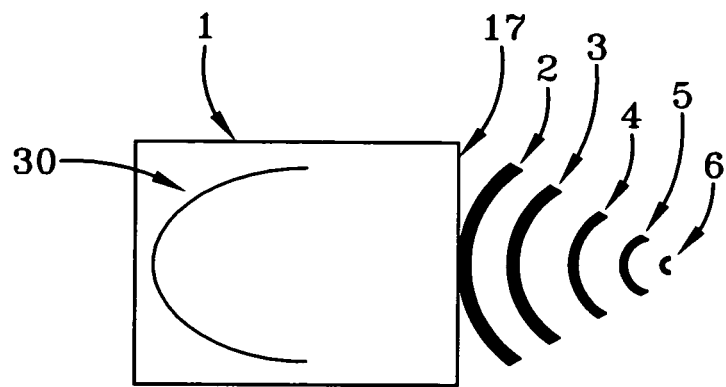
FIG. 4a is a simplified depiction of a pressure pulse/shock wave generator having a focusing element in the form of an ellipsoid. The waves generated are focused.

FIG. 4a is a simplified depiction of the pressure pulse/shock wave generator (shock wave head) having as focusing element an ellipsoid (30). Thus, the generated waves are focused at (6).

Figure 4B:
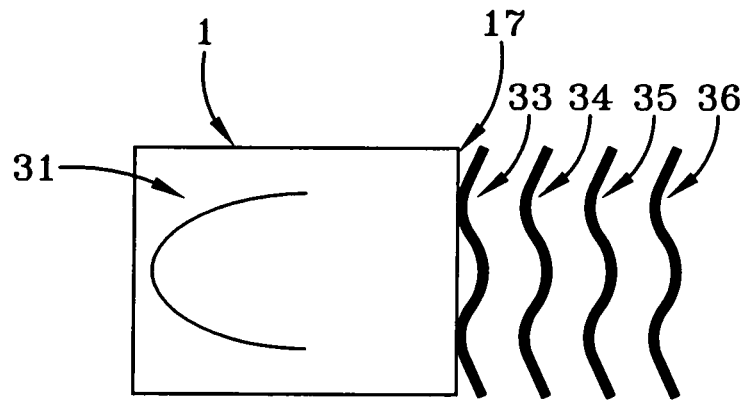
FIG. 4b is a simplified depiction of a pressure pulse/shock wave generator having a parabolic reflector element and generating waves that are disturbed plane.

FIG. 4b is a simplified depiction of the pressure pulse/shock wave generator (shock wave head) having as a focusing element an paraboloid ($y^2=2px$). Thus, the characteristics of the wave fronts generated behind the exit window (33, 34, 35, and 36) are disturbed plane ("parallel"), the disturbance resulting from phenomena ranging from electrode burn down, spark ignition spatial variation to diffraction effects. However, other phenomena might contribute to the disturbance.

Figure 4C:
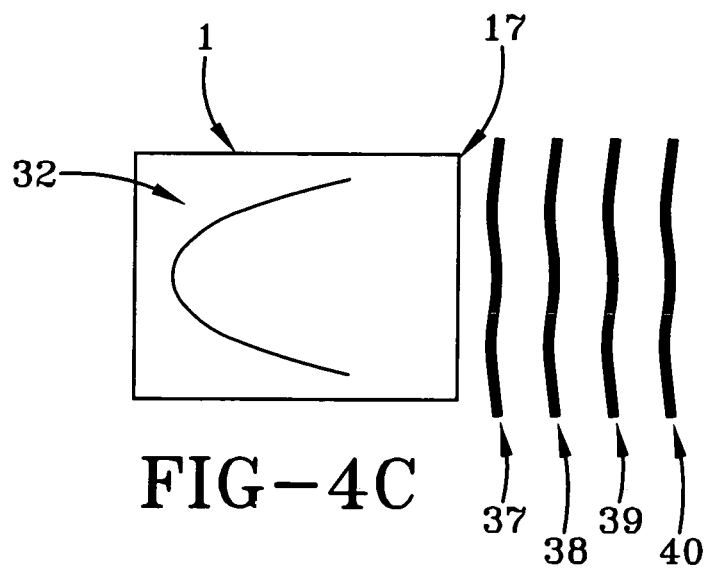
FIG. 4c is a simplified depiction of a pressure pulse/shock wave generator having a quasi parabolic reflector element (generalized paraboloid) and generating waves that are nearly plane/have nearly plane characteristics.

FIG. 4c is a simplified depiction of the pressure pulse/shock wave generator (shock wave head) having as a focusing element a generalized paraboloid ($y^n=2px$, with $1.2<n<2.8$ and $n \neq 2$). Thus, the characteristics of the wave fronts generated behind the exit window (37, 38, 39, and 40) are, compared to the wave fronts generated by a paraboloid ($y^2=2px$), less disturbed, that is, nearly plane (or nearly parallel or nearly even (37, 38, 39, 40)). Thus, conformational adjustments of a regular paraboloid ($y^2=2px$) to produce a generalized paraboloid can compensate for disturbances from, e.g., electrode burn down. Thus, in a generalized paraboloid, the characteristics of the wave front may be nearly plane due to its ability to compensate for phenomena including, but not limited to, burn down of the tips of the electrode and/or for disturbances caused by diffraction at the aperture of the paraboloid. For example, in a regular paraboloid ($y^2=2px$) with p=1.25, introduction of a new electrode may result in p being about 1.05. If an electrode is used that adjusts itself to maintain the distance between the electrode tips ("adjustable electrode") and assuming that the electrodes burn down is 4 mm (z=4 mm), p will increase to about 1.45. To compensate for this burn down, and here the change of p, and to generate nearly plane wave fronts over the life span of an electrode, a generalized paraboloid having, for example n=1.66 or n=2.5 may be used. An adjustable electrode is, for example, disclosed in U.S. Pat. No. 6,217,531.

Figure 4D:
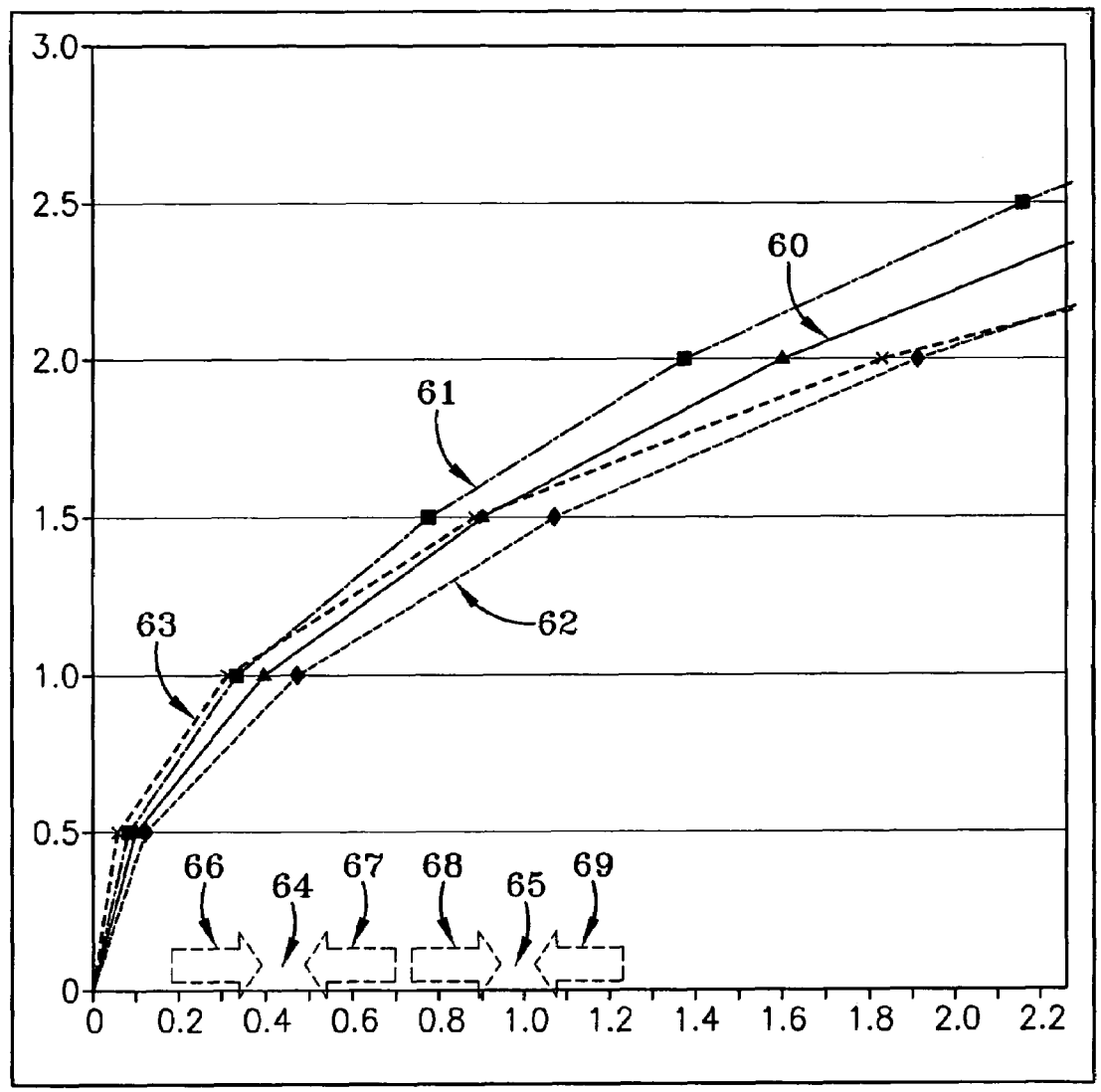
FIG. 4d is a simplified depiction of a generalized paraboloid with better focusing characteristic than a paraboloid in which n=2. The electrode usage is shown. The generalized paraboloid, which is an interpolation (optimization) between two optimized paraboloids for a new electrode and for a used (burned down) electrode is also shown.

FIG. 4d shows sectional views of a number of paraboloids. Numeral 62 indicates a paraboloid of the shape $y^2=2px$ with p=0.9 as indicated by numeral 64 at the x axis which specifies the p/2 value (focal point of the paraboloid). Two electrode tips of a new electrode 66 (inner tip) and 67 (outer tip) are also shown in the Figure. If the electrodes are fired and the tips are burning down the position of the tips change, for example, to position 68 and 69 when using an electrode which adjusts its position to compensate for the tip burn down. In order to generate pressure pulse/shock waves having nearly plane characteristics, the paraboloid has to be corrected in its p value. The p value for the burned down electrode is indicate by 65 as p/2=1. This value, which constitutes a slight exaggeration, was chosen to allow for an easier interpretation of the Figure. The corresponding paraboloid has the shape indicated by 61, which is wider than paraboloid 62 because the value of p is increased. An average paraboloid is indicated by numeral 60 in which p=1.25 cm. A generalized paraboloid is indicated by dashed line 63 and constitutes a paraboloid having a shape between paraboloids 61 and 62. This particular generalized paraboloid was generated by choosing a value of $n \neq 2$ and a p value of about 1.55 cm. The generalized paraboloid compensates for different p values that result from the electrode burn down and/or adjustment of the electrode tips.

Figure 5:
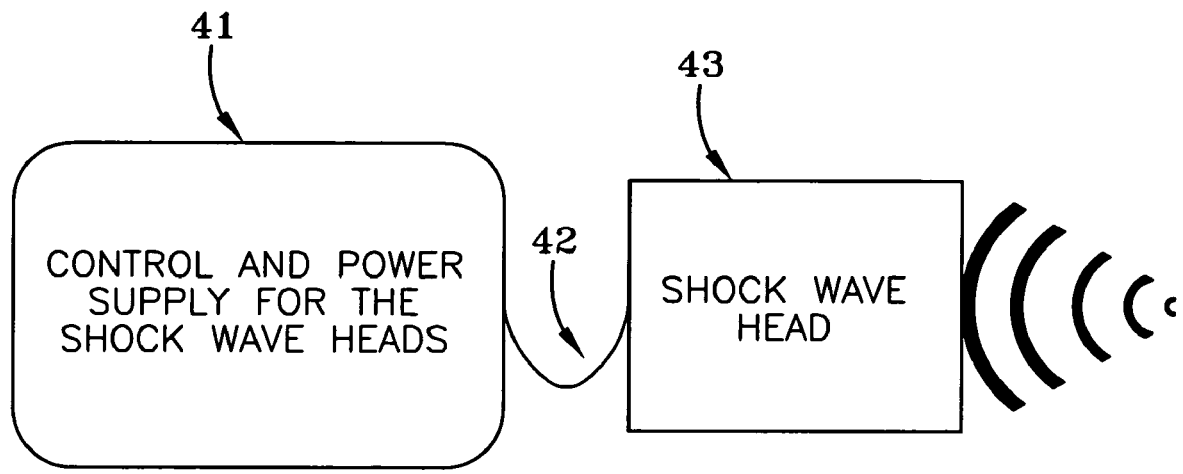
FIG. 5 is a simplified depiction of a pressure pulse/shock wave generator being connected to a control/power supply unit.

FIG. 5 is a simplified depiction of a set-up of the pressure pulse/shock wave generator (43) (shock wave head) and a control and power supply unit (41) for the shock wave head (43) connected via electrical cables (42) which may also include water hoses that can be used in the context of the present invention. However, as the person skilled in the art will appreciate, other set-ups are possible and within the scope of the present invention.

Figure 6:
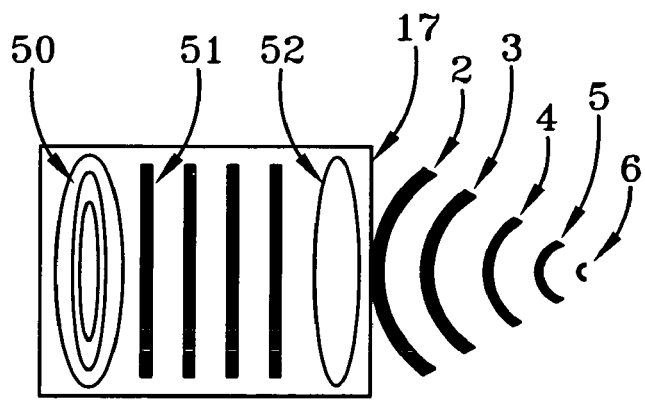
FIG. 6 is a simplified depiction of a pressure pulse/shock wave generator comprising a flat EMSE (electromagnetic shock wave emitter) coil system to generate nearly plane waves as well as an acoustic lens. Convergent wave fronts are leaving the housing via an exit window.

FIG. 6 is a simplified depiction of the pressure pulse/shock wave generator (shock wave head) having an electromagnetic flat coil 50 as the generating element. Because of the plane surface of the accelerated metal membrane of this pressure pulse/shock wave generating element, it emits nearly plane waves which are indicated by lines 51. In shock wave heads, an acoustic lens 52 is generally used to focus these waves. The shape of the lens might vary according to the sound velocity of the material it is made of. At the exit window 17 the focused waves emanate from the housing and converge towards focal point 6.

Figure 7:
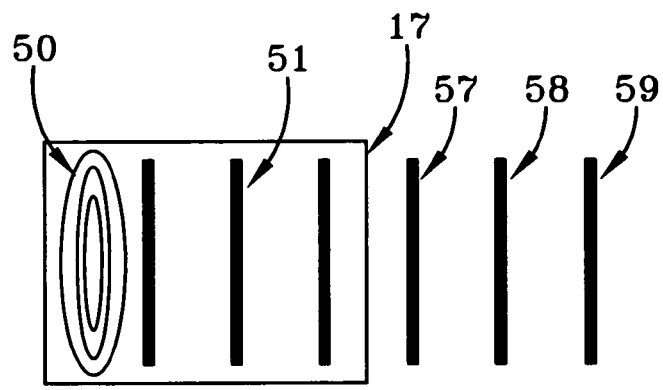
FIG. 7 is a simplified depiction of a pressure pulse/shock wave generator having a flat EMSE coil system to generate nearly plane waves. The generator has no reflecting or focusing element. As a result, the pressure pulse/shock waves are leaving the housing via the exit window unfocused having nearly plane wave characteristics.

FIG. 7 is a simplified depiction of the pressure pulse/shock wave generator (shock wave head) having an electromagnetic flat coil 50 as the generating element. Because of the plane surface of the accelerated metal membrane of this generating element, it emits nearly plane waves which are indicated by lines 51. No focusing lens or reflecting lens is used to modify the characteristics of the wave fronts of these waves, thus nearly plane waves having nearly plane characteristics are leaving the housing at exit window 17.

Figure 8:
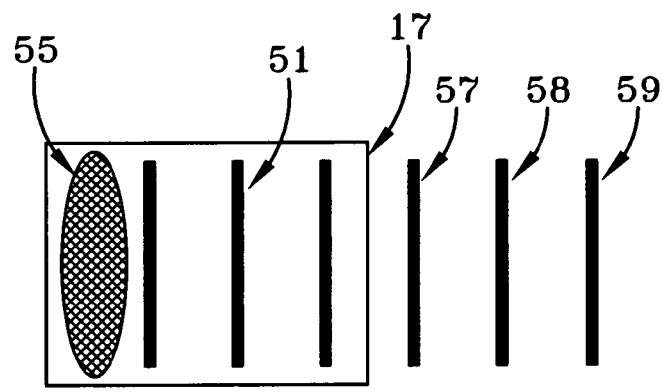
FIG. 8 is a simplified depiction of a pressure pulse/shock wave generator having a flat piezoceramic plate equipped with a single or numerous individual piezoceramic elements to generate plane waves without a reflecting or focusing element. As a result, the pressure pulse/shock waves are leaving the housing via the exit window unfocused having nearly plane wave characteristics.

FIG. 8 is a simplified depiction of the pressure pulse/shock wave generator (shock wave head) having an piezoceramic flat surface with piezo crystals 55 as the generating element. Because of the plane surface of this generating element, it emits nearly plane waves which are indicated by lines 51. No focusing lens or reflecting lens is used to modify the characteristics of the wave fronts of these waves, thus nearly plane waves are leaving the housing at exit window 17. Emitting surfaces having other shapes might be used, in particular curved emitting surfaces such as those shown in FIGS. 4a to 4c as well as spherical surfaces. To generate waves having nearly plane or divergent characteristics, additional reflecting elements or lenses might be used. The crystals might, alternatively, be stimulated via an electronic control circuit at different times, so that waves having plane or divergent wave characteristics can be formed even without additional reflecting elements or lenses.

Figure 9:
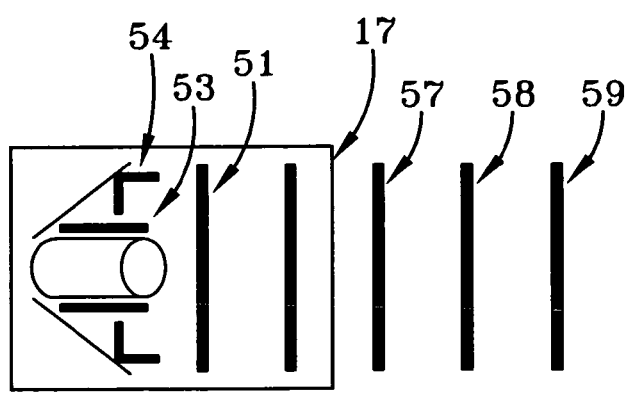
FIG. 9 is a simplified depiction of a pressure pulse/shock wave generator having a cylindrical EMSE system and a triangular shaped reflecting element to generate plane waves. As a result, the pressure pulse/shock waves are leaving the housing via the exit window unfocused having nearly plane wave characteristics.

FIG. 9 is a simplified depiction of the pressure pulse/shock wave generator (shock wave head) comprising a cylindrical electromagnet as a generating element 53 and a first reflector having a triangular shape to generate nearly plane waves 54 and 51. Other shapes of the reflector or additional lenses might be used to generate divergent waves as well.

Figure 10:
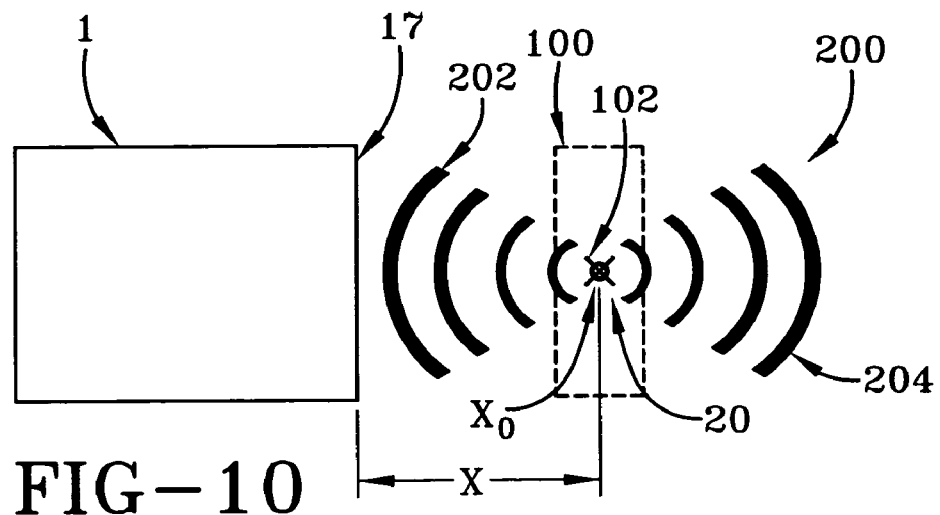
FIG. 10 is a simplified depiction of a pressure pulse/shock wave (PP/SW) generator with focusing wave characteristics shown focused with the focal point or geometrical focal volume being on a substance of one or more aquatic life forms, the focus being targeted on the location $X_0$.
Figure 11:
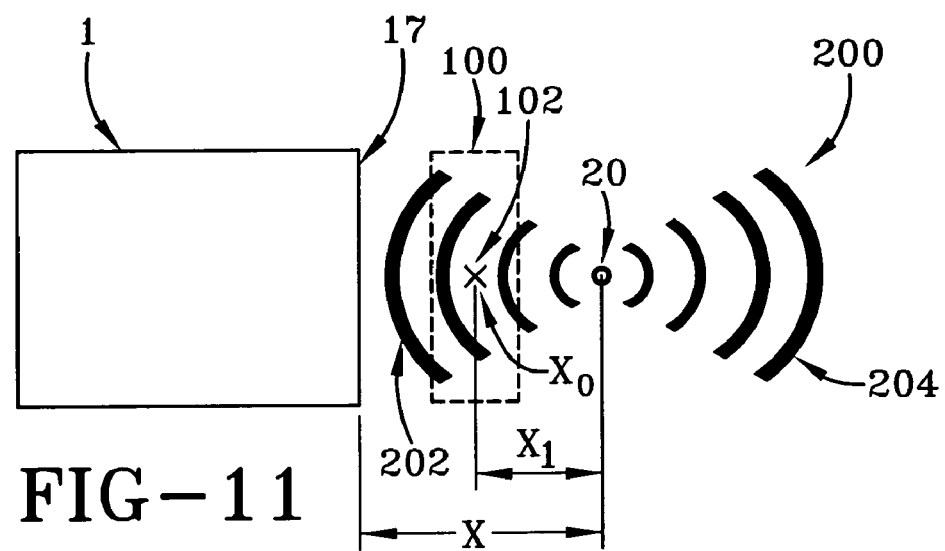
FIG. 11 is a simplified depiction of a pressure pulse/shock wave (PP/SW) generator with the focusing wave characteristics shown wherein the focus is located a distance $X_1$ from the location $X_0$ of a substance of one or more aquatic life forms wherein the converging waves impinge the substance.
Figure 12:
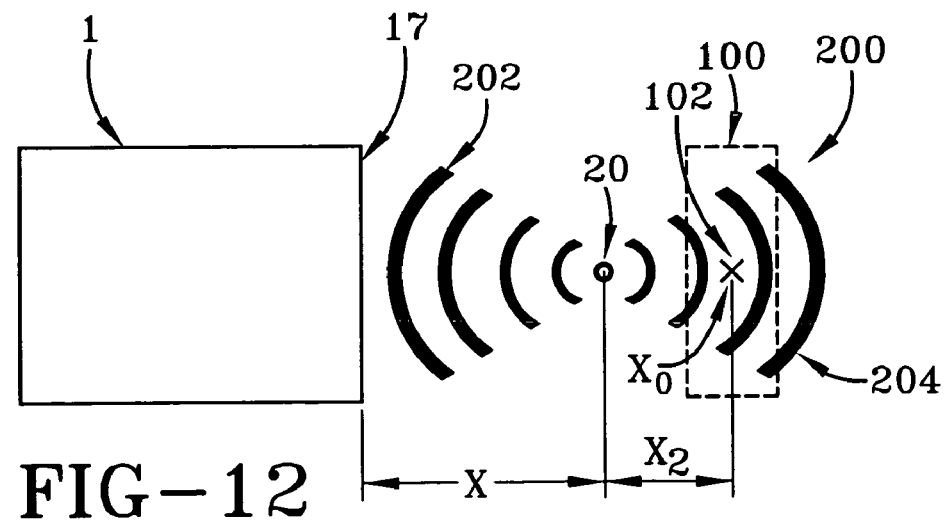
FIG. 12 is a simplified depiction of a pressure pulse/shock wave (PP/SW) generator with focusing wave characteristics shown wherein the focus is located a distance $X_2$ from the location $X_0$ wherein the emitted divergent waves impinge the substance.

With reference to FIGS. 10, 11 and 12 a schematic view of a shock wave generator or source 1 is shown emitting a shock wave front 200 from an exit window 17. The shock wave front 200 has converging waves 202 extending to a focal point or focal geometric volume 20 at a location spaced a distance X from the generator or source 1. Thereafter the wave front 200 passes from the focal point or geometric volume 20 in a diverging wave pattern as has been discussed in the various other FIGS. 1-9 generally.

With particular reference to FIG. 10 an aquatic tissue 100 is shown generally centered on the focal point or volume 20 at a location $X_0$ within the tissue 100. In this orientation the emitted waves are focused and thus are emitting a high intensity acoustic energy at the location $X_0$. This location $X_0$ can be anywhere within or on the tissue 100. This procedure runs the risk of some cell rupturing depending on the intensity at the focal point $X_0$.

With reference to FIG. 11, the aquatic tissue 100 is shifted a distance X toward the generator or source 1. The tissue 100 at location $X_0$ being positioned a distance $X-X_1$ from the source 1. This insures the tissue 100 is impinged by converging waves 202 but removed from the focal point 20. When the tissue 100 is impacted with this bombardment of converging waves 202 it stimulates the cells activating the desired response as previously discussed.

With reference to FIG. 12, the tissue 100 is shown shifted or located in the diverging wave portion 204 of the wave front 200. As shown $X_0$ is now at a distance $X_2$ from the focal point or geometric volume 20 located at a distance X from the source 1. Accordingly $X_0$ is located a distance $X+X_2$ from the source 1. As in FIG. 10 this region of diverging waves 204 can be used to stimulate the tissue 100 which when the tissue is a cellular tissue stimulates the cells to produce the desired growth effect or response.

As shown in FIGS. 1-12 the use of these various acoustic shock wave forms can be used separately or in combination to achieve the desired effect of stimulating growth.

Furthermore such acoustic shock wave forms can be used in combination with chemical or drug treatments, gene therapy or cloning or vaccination or inducing tolerance methods and when so combined the stimulated cells will more rapidly grow increasing productivity and potentially improving yields.

The present invention provides an apparatus for an effective treatment of aquatic life form tissues, which benefit from high or low energy pressure pulse/shock waves having focused or unfocused, nearly plane, convergent or even divergent characteristics. With an unfocused wave having nearly plane, plane, convergent wave characteristic or even divergent wave characteristics, the energy density of the wave may be or may be adjusted to be so low that side effects including cellular membrane damage do not exist at all.

In certain embodiments, the apparatus of the present invention is able to produce waves having energy density values that are below 0.1 mJ/mm2 or even as low as 0.000 001 mJ/mm2. In a preferred embodiment, those low end values range between 0.1-0.001 mJ/mm2. With these low energy densities, side effects are reduced and the dose application is much more uniform. Additionally, the possibility of harming surface tissue is reduced when using an apparatus of the present invention that generates unfocused waves having planar, nearly plane, convergent or divergent characteristics and larger transmission areas compared to apparatuses using a focused shock wave source that need to be moved around to cover the treated area. The apparatus of the present invention also may allow the user to make more precise energy density adjustments than an apparatus generating only focused shock waves, which is generally limited in terms of lowering the energy output.

The treatment of the above mentioned aquatic tissue or body of an aquatic life form is believed to be a first time use of acoustic shock wave therapy. None of the work done to date has treated the above mentioned life forms with convergent, divergent, planar or near-planar acoustic unfocused shock waves of low energy or high energy focused shock waves in a transmission path from the emitting source lens or cover to the target site for the purpose of disease resistance or growth stimulation.

It will be appreciated that the apparatuses and processes of the present invention can have a variety of embodiments, only a few of which are disclosed herein. It will be apparent to the artisan that other embodiments exist and do not depart from the spirit of the invention. Thus, the described embodiments are illustrative and should not be construed as restrictive.

The use of acoustic shock waves to aquatic tissue stimulates a cellular response of the treated tissues as well as a cellular response in any surrounding tissue. This response activates otherwise dormant cells to increase the growth mechanisms, allowing the cells to rapidly replicate to initiate the growth process.

A further benefit of the use of acoustic shock waves is there are no known adverse indications when combined with the use of other nutrients. In fact the activation of the cells exposed to shock wave treatments only enhances cellular absorption of such nutrients making them faster acting than when compared to non stimulated cells. As a result, it is envisioned that the use of one or more nutrients prior to, during or after subjecting the tissue to acoustic shock waves will be complimentary to the treatment or pre-conditioning treatment. It is further appreciated that certain uses of vaccines or antibodies can be altered or modified to lower risk or adverse side effects when combined with a treatment involving acoustic shock waves as described above.

Another aspect of the present invention is the use of acoustic shock waves can be combined with organic food farming. The treatment does not require genetic alteration or manipulation to accelerate the otherwise natural growth of aquatic tissue as such the use of acoustic shock waves is compatible with organic farming practices as well as the new fields of genetic engineering.

Contrary to the findings of Vago in U.S. patent application Publication US 2005/0075587, the present invention has found a novel and unique way of providing pressure pulse and shock wave patterns that avoid the problem of cavitation and resultant cellular tissue damage when used in cleaning open wounds. Additionally the methods described above provide germicidal effects in the treated area that further minimize the spread of infection; as such the present invention is an appropriate treatment for the germicidal cleaning of wounds in aquatic life forms as well as mammals.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. The method of stimulating an aquatic life form comprises the steps of:
    activating a pressure pulse or an acoustic shock wave generator or source to emit pressure pulses or acoustic shock waves wherein the pressure pulses or acoustic shock waves are acoustic pulses which include several cycles of positive and negative pressure, the amplitude of the positive part of such a cycle being above 0.1 MPa having rise times of the positive part of the first pressure cycle amplitude being below 100's of ns and the duration being below 1 to 3 micro-seconds (μs) for the positive part of a cycle and above some micro-seconds for the negative part of a cycle; and
    subjecting cellular tissue of the aquatic life form to the pressure pulses or acoustic shock waves stimulating said aquatic life form with convergent, divergent, planar or near planar acoustic shock waves or pressure pulses in the absence of a focal point impinging the aquatic life form stimulating a cellular response in the absence of creating cavitation bubbles evidenced by not experiencing the sensation of cellular hemorrhaging caused by the emitted waves or pulses in the cellular tissue of the aquatic life form wherein the cellular tissue of the aquatic life form is positioned within a path of the emitted pressure pulses or shock waves away from any localized geometric focal volume or point of the emitted shock waves wherein the emitted shock waves or pressure pulses either have no geometric focal volume or point or have a focal volume or point ahead of the aquatic life form or beyond the aquatic life form thereby passing the emitted waves through the aquatic life form while avoiding having any localized focal point within the aquatic life form wherein the emitted pressure pulses or shock waves are convergent, divergent, planar or near planar and the pressure pulse shock wave generator or source is based on electro-hydraulic, electromagnetic, piezoceramic or ballistic wave generation having an energy density value ranging as low as 0.00001 mJ/mm$^2$ to a high end of below 1.0 mJ/, the stimulation having a dosage duration between a few seconds to 20 minutes or greater at an energy density in the range of 0.00001 mJ/mm$^2$ to 1.0 mJ/mm$^2$ per shock wave or less while avoiding or minimizing cell or membrane damage or rupturing by not creating cavitation bubbles in the tissue of the aquatic life form.

2. The method of stimulating an aquatic life form of claim 1 wherein the emitted pulses or shock waves are divergent or near planar.

3. The method of stimulating an aquatic life form of claim 1 wherein the emitted pulses or shock waves are convergent having a geometric focal volume or point at a distance of at least X from the generator or source, the method further comprising positioning the aquatic life form at a distance less than the distance X from the source.

4. The method of stimulating an aquatic life form of claim 1 wherein the aquatic life form is tissue having cells.

5. The method of stimulating an aquatic life form of claim 4 wherein the tissue is one or more embryos, eggs or larvae or immature or not fully mature specimen of an aquatic life form.

6. The method of stimulating an aquatic life form of claim 5 wherein the life form is a fish.

7. The method of stimulating an aquatic life form of claim 5 wherein the life form is a shellfish.

8. The method of stimulating an aquatic life form of claim 5 wherein the life form is a mollusk.

9. The method of stimulating an aquatic life form of claim 4 wherein the life form is a crustacean.

10. The method of stimulating an aquatic life form of claim 5 wherein the life form is shrimp.

11. The method of stimulating an aquatic life form of claim 5 wherein the life form is a scallop.

12. The method of stimulating an aquatic life form of claim 5 wherein the life form is an oyster.

13. The method of stimulating an aquatic life form of claim 4 wherein the life form is a clam.

14. The method of stimulating an aquatic life form of claim 4 wherein the life form is a lobster.

15. The method of stimulating an aquatic life form of claim 14 wherein the life form is a crab.

16. The method of stimulating an aquatic life form of claim 14 wherein the life form is an abalone.

17. The method of stimulating an aquatic life form of claim 4 wherein the aquatic life form tissue is infected or exposed to a viral or bacterial infection.

18. The method of stimulating an aquatic life form of claim 4 wherein the tissue has a degenerative condition or wound.

19. The method of stimulating an aquatic life form of claim 4 wherein the tissue is being treated with one or more anti-viral or anti-bacterial medications.

20. The method of stimulating an aquatic life form of claim 4 wherein the tissue is being treated with one or more vaccines or tolerines.

21. The method of germicidally cleaning a wound on an aquatic life form comprises the steps of:
    activating a pressure pulse or an acoustic shock wave generator or source to emit pressure pulses or acoustic shock waves wherein the pressure pulses or acoustic shock waves are acoustic pulses which include several cycles of positive and negative pressure, the amplitude of the positive part of such a cycle being above 0.1 MPa having rise times of the positive part of the first pressure cycle amplitude being below 100's of ns and the duration being below 1 to 3 micro-seconds (μs) for the positive part of a cycle and above some micro-seconds for the negative part of a cycle; and
    subjecting the wound of the aquatic life form to the pressure pulses or acoustic shock waves thereby cleaning said wound wherein the wound is positioned within a path of the emitted pressure pulses or shock waves away from any localized geometric focal volume or point of the emitted shock waves wherein the emitted shock waves or pressure pulses either have no geometric focal volume or point or have a focal volume or point ahead of the wound or beyond the wound thereby passing the emitted waves through the wound while avoiding having any localized focal point within the wound wherein the emitted pressure pulses or shock waves are convergent, divergent, planar or near planar and the pressure pulse shock wave generator or source is based on electro-hydraulic, electromagnetic, piezoceramic or ballistic wave generation having an energy density value ranging as low as 0.00001 mJ/mm$^2$ to a high end of below 1.0 mJ/mm$^2$, the stimulation having a dosage duration between a few seconds to 20 minutes or greater at an energy density in the range of 0.00001 mJ/mm$^2$ to 1.0 mJ/mm$^2$ per shock wave or less while avoiding or minimizing cell or membrane damage or rupturing by not creating cavitation bubbles in the tissue of the aquatic life form.

* * * * *